United States Patent
Dekhil et al.

(10) Patent No.: US 6,453,265 B1
(45) Date of Patent: Sep. 17, 2002

(54) ACCURATELY PREDICTING SYSTEM BEHAVIOR OF A MANAGED SYSTEM USING GENETIC PROGRAMMING

(75) Inventors: Mohamed Dekhil, Sunnyvale; Evan R. Kirshenbaum, Mountain View; Jerremy Holland, Los Altos Hills, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/473,793

(22) Filed: Dec. 28, 1999

(51) Int. Cl.⁷ .............................................. G06F 17/18
(52) U.S. Cl. ...................................... 702/181; 702/182
(58) Field of Search .................... 706/13, 21; 187/130; 395/22, 23, 13; 364/554; 714/26

(56) References Cited

U.S. PATENT DOCUMENTS

| | | | | |
|---|---|---|---|---|
| 5,168,136 A | * | 12/1992 | Thangavelu et al. | 187/130 |
| 5,402,521 A | * | 3/1995 | Niida et al. | 395/22 |
| 5,479,573 A | * | 12/1995 | Keeler et al. | 395/23 |
| 5,581,657 A | * | 12/1996 | Lyon | 395/13 |
| 5,742,738 A | * | 4/1998 | Koza et al. | 395/13 |
| 5,745,383 A | * | 4/1998 | Barber | 364/554 |
| 5,919,267 A | * | 7/1999 | Urnes et al. | 714/26 |
| 5,930,780 A | * | 7/1999 | Hughes et al. | 706/13 |
| 6,128,555 A | * | 10/2000 | Hanson et al. | 701/13 |
| 6,144,952 A | * | 11/2000 | Keeler et al. | 706/21 |
| 6,282,527 B1 | * | 8/2001 | Gounares et al. | 706/13 |
| 2001/0013027 A1 | * | 8/2001 | Akkiraju et al. | 706/21 |

* cited by examiner

Primary Examiner—John S. Hilten
Assistant Examiner—Douglas N Washburn
(74) Attorney, Agent, or Firm—Thomas X. Li (57) ABSTRACT

A system for monitoring system behavior of a managed/instrumented system is described. The system includes a measurement module coupled to the managed system to generate measurement data of the managed system. The measurement data include past measurement data and current measurement data. A store is also provided that stores the past measurement data. A genetic programming module is coupled to the store to evolve the evolved predictor based on the past measurement data and predetermined effectiveness criteria such that the evolved predictor predicts the system behavior of the managed system when supplied with the current measurement data. The genetic programming module genetically manipulates a set of candidate predictors to produce the evolved predictor. A system for generating the evolved predictor is also described.

13 Claims, 7 Drawing Sheets

PREDICTOR P1

If X >17
then problem occurs in 5 hours
otherwise
problem occurs in Y+2 hours

ACCURATELY PREDICTING SYSTEM BEHAVIOR OF A MANAGED SYSTEM USING GENETIC PROGRAMMING

BACKGROUND OF THE INVENTION

1. Field of the Invention

The present invention pertains to monitoring and measuring behavior of a managed system. More particularly, this invention relates to accurately predicting system behavior of a managed system (e.g., a distributed application system) using an evolved predictor generated by genetic programming.

2. Description of the Related Art

Figure 1:
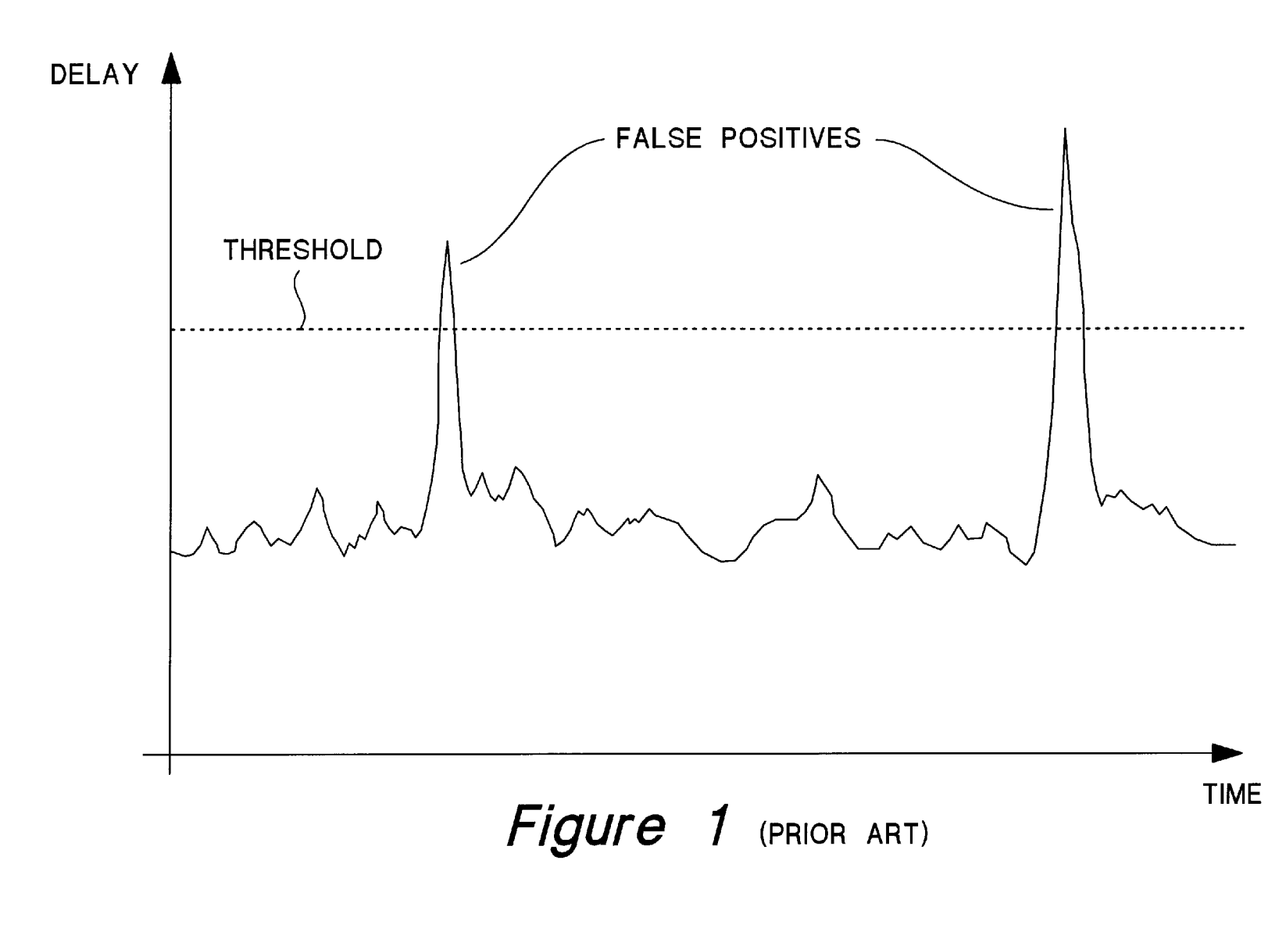
FIG. 1 shows one prior art approach of monitoring a system with pre-defined static thresholds.

As we know, one prior art monitoring solution for managing a software application running on a computer system employs predetermined static threshold values to measure the performance of the application. FIG. 1 shows this prior art solution. The threshold value used is typically based on experience and/or intuition. This prior art solution is acceptable for applications running on a single computer and involving very few measurements.

However, this prior art solution will not be suitable for measuring large dynamic distributed applications with hundreds of metrics. A distributed application system operates in a distributed or federated computing environment. Such an environment is typically characterized by independent computer systems in individual administrative domains that are loosely coupled by networks and cooperate to provide computing resources for a global application (i.e., the distributed application). One example of such a distributed application system is the Internet.

One reason that the above-mentioned prior art solution will not be suitable for the large dynamic distributed applications with hundreds of metrics is that this simple prior art solution is typically not sufficient to capture complex interactions between various metrics. In particular, it is not sufficient to capture complex correlation between metrics on different computer systems in different administrative or control domains. Another reason is that this prior art approach is not flexible enough to incorporate the dynamic behavior of the distributed application, which may radically change over time.

Another problem associated with the above-mentioned prior art solution is that the use of predetermined static threshold values is sensitive to spikes in the measured data. For example and as can be seen from FIG. 1, if the value of one measurement exceeds the threshold for a short period of time due to a transient malfunction of the application, alarms will go off, notifying the existence of a problem. This will result in increased false positives, which can be very annoying, and in some cases, very costly.

Figure 2:
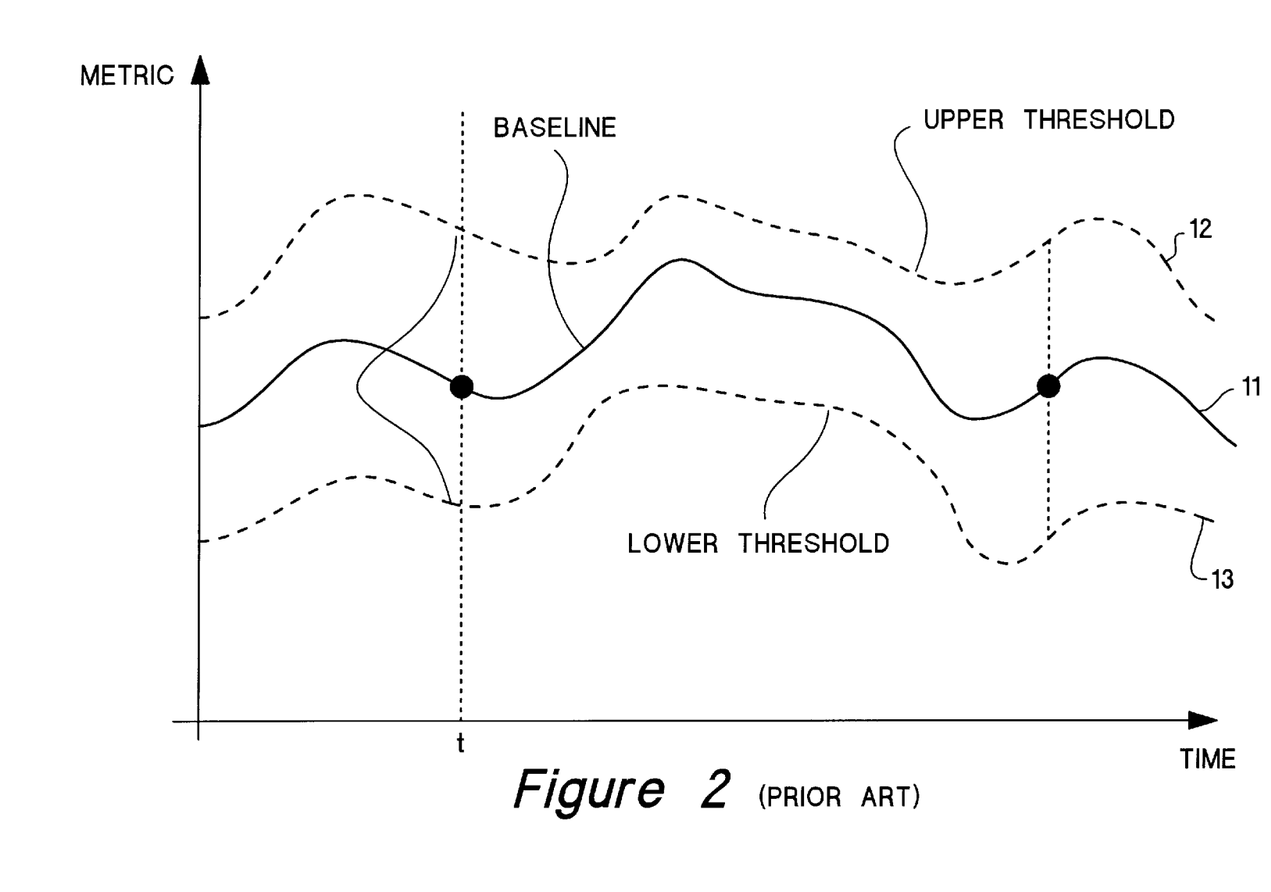
FIG. 2 shows another prior art approach of monitoring a system with a variable baseline threshold.

Another prior art approach to monitoring a system with thresholds is referred to as baselining. The main idea of baselining is to automatically determine the "normal" or "expected" value of a metric or measurement. In general, a baseline is a representation of how a system behaves under normal conditions at various times. This is particularly useful for selecting threshold values that defines desirable or acceptable ranges for each of the metrics as a function of the baseline for that metric. FIG. 2 shows a threshold range that is defined as a function of the baseline 11. In FIG. 2, the curve 12 shows the upper threshold of the baseline 11 and the curve 13 shows the lower threshold of the baseline 11.

The advantage of this approach is the ability to automatically select threshold values that takes into account the dynamic behavior of the system being monitored. However, problems are still associated with this prior art baselining approach. One problem is that the approach does not capture relationships between metrics, which reduces its predictive power and limits its use to single metrics or predefined functions that represent known (and mostly simple) relationships. This means that the approach still looks at each individual measurement in isolation. Another problem associated with the approach is its sensitivity to several required parameters such as sampling rate and age factor. As a result, system behavior of the monitored system cannot be accurately predicted. The prior art approach can only indicate problems when the problems actually occur. One more problem of the prior art approach is its inability to classify problems. It can only tell if the event is normal or abnormal.

Thus, there exists a need for a predictor that can accurately predict system behavior of a distributed application system.

SUMMARY OF THE INVENTION

One feature of the present invention is to accurately and best predict the behavior of a system.

Another feature of the present invention is to predict the behavior of a system using genetic programming.

A further feature of the present invention is to define or generate an evolved predictor that accurately and best predicts the behavior of a system at any given time.

A still further feature of the present invention is to train a genetic programming module with past measurement data of a managed system to evolve a predictor that accurately and best predicts the behavior of the managed or instrumented system at any given time.

A system for defining or generating an evolved predictor for a managed or instrumented system is described. The evolved predictor predicts the behavior of the managed system. The system includes a store that stores past measurement data of the managed system. The past measurement data include an identified event of interest. The system also includes a genetic programming module coupled to the store to genetically manipulate a set of candidate predictors to evolve the predictor based on the past measurement data and fitness/effectiveness criteria such that the evolved predictor best predicts the event of interest of the system when the predictor is supplied with current measurement data of the managed system.

A system for monitoring the behavior of a distributed application system includes a measurement module coupled to the distributed application system to generate measurement data of the distributed application system. The measurement data include past measurement data and current measurement data. The past measurement data include one or more identified events of interest. A store is also provided that stores the past measurement data. A genetic programming module is coupled to the store to evolve the evolved predictor. The genetic programming module genetically manipulates a set of candidate predictors to produce the evolved predictor that best predicts the events of interest based on the past measurement data and predetermined fitness/effectiveness criteria when the predictor is supplied with the current measurement data of the distributed application system.

Other features and advantages of the present invention will become apparent from the following detailed description, taken in conjunction with the accompanying drawings, illustrating by way of example the principles of the invention.

DETAILED DESCRIPTION OF THE INVENTION

Figure 3:
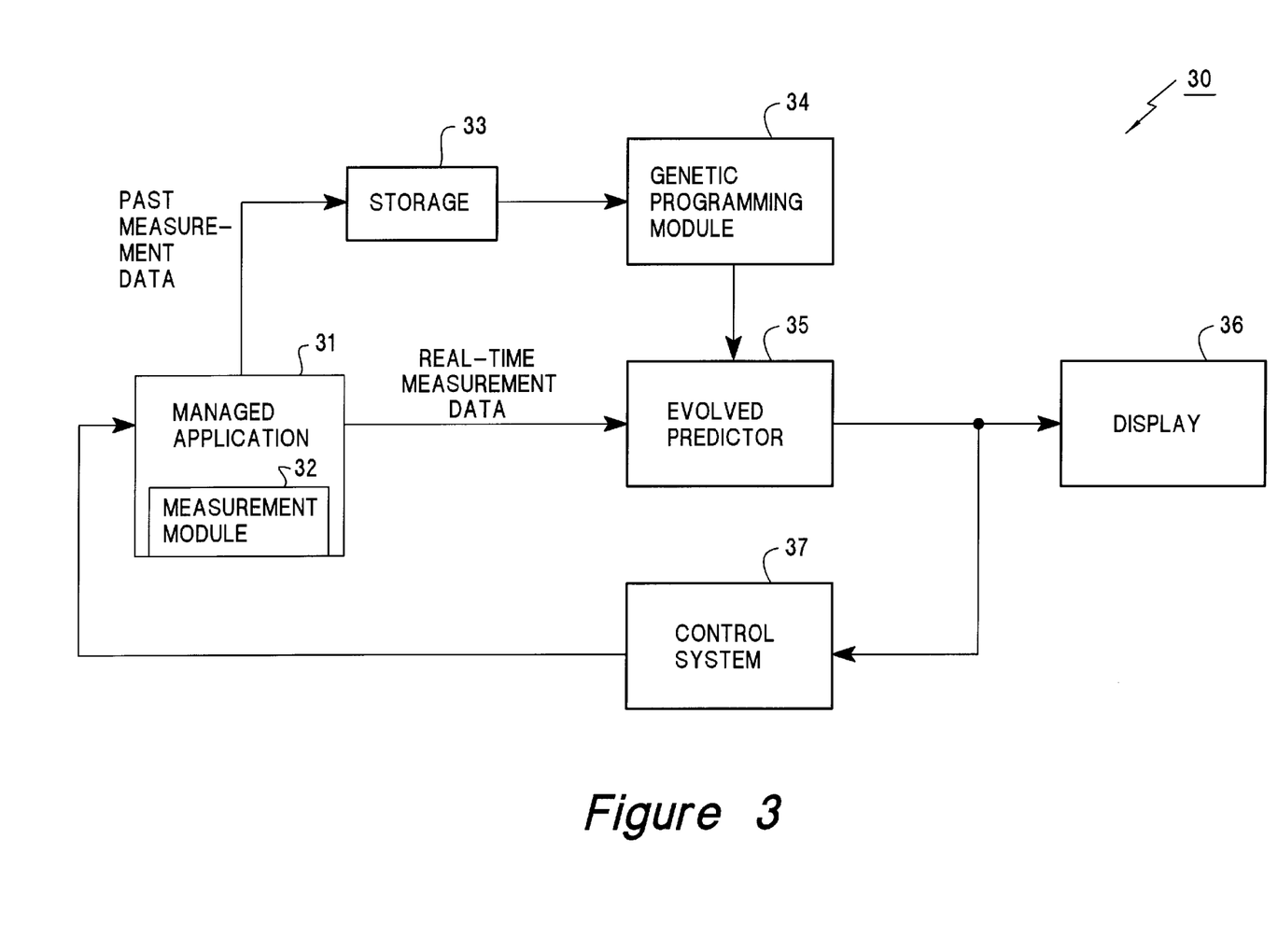
FIG. 3 shows an overview of a monitoring and measurement system that includes a genetic programming module to evolve an evolved predictor that accurately predicts the behavior of a managed system in accordance with one embodiment of the present invention.

FIG. 3 shows an overview of a monitoring system 30 for a system 31. The system 31 can be any kind of system or target being monitored. In one embodiment, the system 31 is a distributed software application program running on a federated or distributed computing environment. In another embodiment, the system 31 is an Internet/Intranet application system. In a further embodiment, the system 31 can be a distributed system, a distributed application system, a single system, or a single application system. Alternatively, the system 31 is not limited to be one of the above mentioned system and can be any kind of managed or instrumented system or target. The system 31 may alternatively referred to as a managed application or managed system below.

The monitoring system 30 can most accurately predict the overall system behavior of the system 31 in accordance with one embodiment of the present invention. This means that the monitoring system 30 can predict when a problem (or event of interest) will occur in the system 31 ahead of time. The monitoring system 30 functionally or conceptually includes a measurement module 32, a store 33, a genetic programming module 34, an evolved predictor program 35, a display 36, and a control system 37.

As will be described in more detail below, the store 33 stores past measurement data of the managed application system 31 generated by the measurement module 32. The genetic programming module 34 is trained by the past measurement data against predetermined effectiveness criteria of the system 31 to "genetically" evolve the evolved predictor 35 that most accurately predict system behavior (e.g., performance violations or system problems) or events of interest of the system 31 ahead of time when the evolved predictor 35 is supplied with the current measurement data of the system 31.

The genetic programming module 34 uses genetic programming techniques to classify, identify, and predict behavior patterns of the system 31 in order to evolve the evolved predictor 35. The genetic programming module 34 evolves the evolved predictor 35 by "genetically" manipulating a set of candidate predictors based on the past measurement data and the predetermined effectiveness criteria to grow new generations of candidate predictors that maximize the prediction accuracy or effectiveness of the candidate predictors in the new generation. The process of "growing" new generations of candidate predictors in the genetic programming module 34 continues until a desired predictor that best predicts the system behavior of the system 31 based on the past measurement data is evolved. That predictor then becomes the evolved predictor 35. The evolved predictor 35 most accurately predicts the system behavior of the managed application system 31 when supplied with current measurement data from the measurement module 32.

This genetic process in the genetic programming module 34 to evolve the evolved predictor 35 is a random process biased by the effectiveness criteria. This makes the finally evolved predictor 35 an evolved predictor program.

One advantage of the monitoring system 30 is that preknowledge of system performance of the managed system 31 is not required although the events of interest need to be identified. The pre-knowledge is necessary if metrics or measurements were to be selected and thresholds were to be set for these metrics. The use of the monitoring system 30 reduces the amount of work required to author and update monitoring policies and increases the out-of-box value of the management solution. In addition, learning algorithm can be designed to ignore temporary and transient behaviors. This reduces false positives and increases detection accuracy.

Another advantage of the monitoring system 30 is that the system can be applied to learn the behavior of a distributed system spanning over tens or hundreds of machines, which is very difficult, if not possible, using the prior art monitoring techniques. In addition, the learning scheme of the genetic programming module 34 utilizes all the information available to classify the system behavior of the managed system 31. This provides higher prediction power than the prior art monitoring techniques that may overlook measures that have direct or indirect effect on the monitored behaviors. The monitoring system 30 will be described in more detail below, also in conjunction with FIGS. 3–7.

As can be seen from FIG. 3, the monitoring system 30 includes the measurement module 32. This module is used to monitor the managed system 31 and to generate measurements of the managed system 31. The measurement module 32 does this by taking various measurements at various locations or execution stages of the managed system 31. This can be done using any known monitoring and measurement techniques. The measurements obtained by the measurement module 32 reflect the overall performance and availability of the managed application 31 at the time when the measurements are taken. This means that the measurements can be analyzed to determine or predict if the managed system 31 is problematic or not. As is known, the behavior of a system is characterized by the trend and correlation of a collection of measurements over a period of time. The measurements obtained by the measurement module 32 can be continuous or non-continuous. The measurements can also be referred to as measurement data.

The measurement data generated by the measurement module 32 include past measurement data and current measurement data. The past measurement data indicate past performance and availability of the managed application 31 (which can be a few minutes, a few hours, a day, a month, or a year in the past). The past measurement data can be obtained by the measurement module 32 in real-time manner in the past. The current measurement data indicate the current behavior (i.e., present behavior) of the managed application 31. The current measurement data are also obtained in real-time fashion by the measurement module 32. The difference between the past measurement data and the current measurement data is that the past measurement data indicate past system behavior while the current measurement data indicate present system behavior of the managed system 31. The past measurement data also should be labeled with the events of interest. The labels identify the time and type of the events of interest to the monitoring system 30. The measurement module 32, however, does not predict the system behavior of the managed system 31. The measurement module 32 can be implemented using any known monitoring means. In addition, the collection of the measurement data by the measurement module 32 can also be done using any known technology. The measurement module 32 may also include a number of measurement modules.

In one embodiment, the measurement module 32 is embedded in the managed system 31. This means that when, for example, the managed system 31 is a software application, the measurement module 32 can also be a software program. In this case, the measurement module 32 can be a single module software program or multi-module software program. In another embodiment, the measurement module 32 is an independent module separate from the managed application 31.

The store 33 of the monitoring system 30 stores the past measurement data of the managed system 31. Alternatively, the past measurement data stored in the store 33 can be replaced with simulated data. The simulated data can be a mixture of past measurement data and man-made data. The store 33 can be implemented by any known storage means (e.g., disk storage, CD-ROM storage, volatile or non-volatile memory storage, database, or text files).

The genetic programming module 34 receives the past measurement data from the store 33. If the store 33 stores the simulated data instead of the past measurement data, then the genetic programming module 34 receives the simulated data. The genetic programming module 34 then trains a set of candidate predictors based on the past measurement data and a set of predetermined effectiveness (or fitness) criteria to evolve the evolved predictor 35 that predicts system behavior of the managed application 31.

Figure 4:
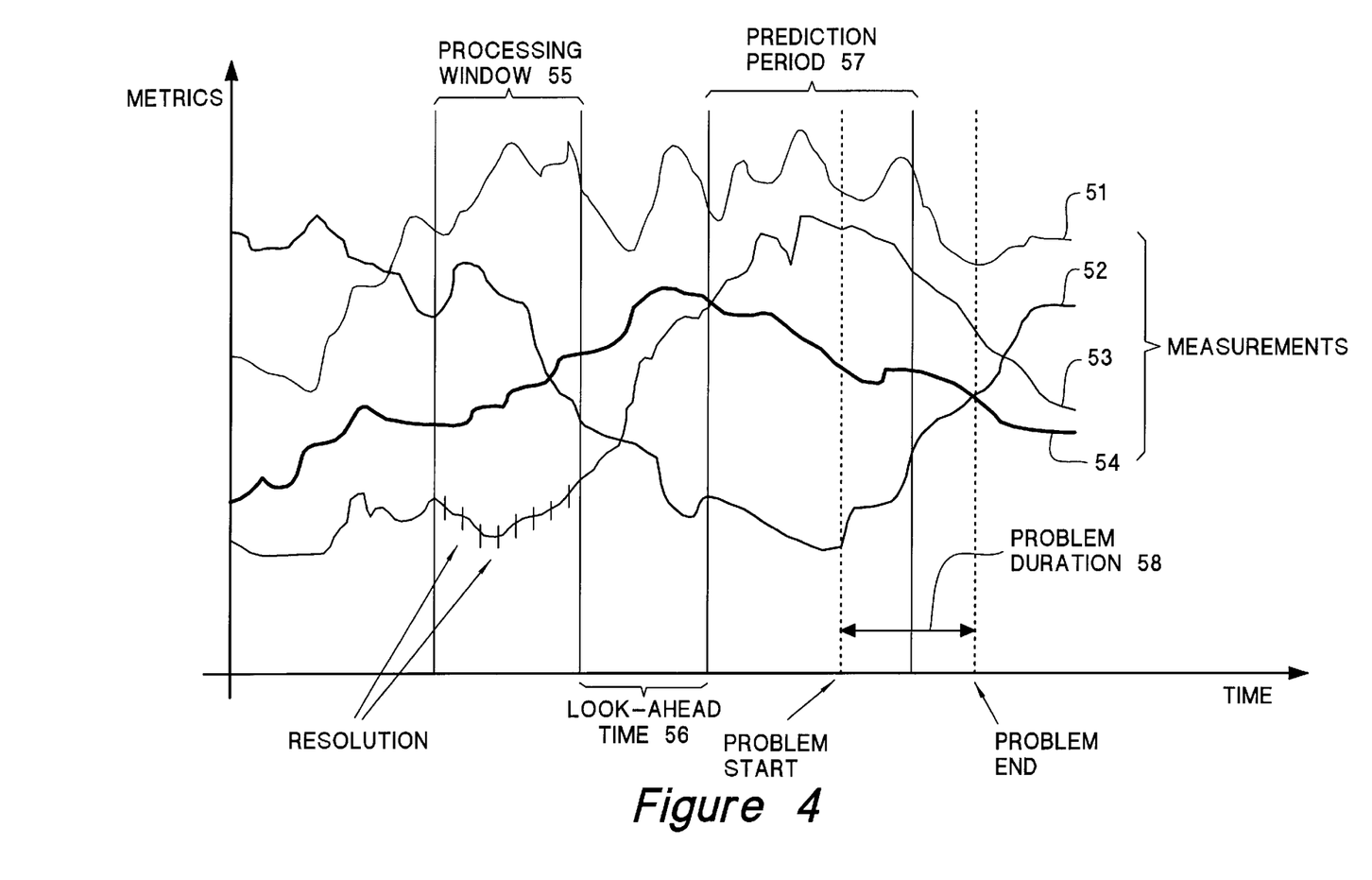
FIG. 4 shows various effectiveness criteria for the genetic programming module of FIG. 3 to evolve the evolved predictor.

The goal of the genetic programming module 34 is to identify a predictor that most accurately predicts the behavior (e.g., the events of interest) of the managed system 31. The desired predictor will then look at the current measurement data for some period of time immediately prior to the time the predictor is run (i.e., the processing window 55 in FIG. 4) and identify events of interest to the operator or user of the monitoring system 30 which the predictor asserts are likely to occur during an identified period of time in the future (i.e., prediction period 57). The interval between the time the prediction is made and the beginning of the prediction period is referred to as the lookahead time 56 (FIG. 4). The predictor may also assert its confidence in its predictions and its belief regarding the severity and/or duration of the identified problem.

In one embodiment, the predictor may identify a single event. In another embodiment, it may identify multiple events, or the time a specified event is expected to occur.

The effectiveness criteria are predefined or predetermined. The effectiveness criteria are set to measure the effectiveness of a candidate predictor generated by the genetic programming module 34 in predicting system behavior of the managed application 31. The effectiveness criteria vary, depending on the type of performance problems the evolved predictor 35 is going to predict and the priorities of the user. The criteria also vary, depending on the type of the managed application 31 being monitored. The effectiveness criteria are designed to optimize the outcome of the evolved predictor 35. In other words, they are designed to make the evolved predictor 35 more accurate in predicting the system behavior of the managed application 31. FIG. 4 shows one example of selecting the effectiveness criteria, which will be described in more detail below.

As can be seen from FIG. 4, curves 51 through 54 indicate various measurements of the managed application 31. The effectiveness criteria are used for evaluating the accuracy and efficiency of the performance mishaps of the managed application 31. In this case, the effectiveness criteria can be defined as follows.

Minimize false positives and negatives (i.e., maximize prediction accuracy).

Minimize the size of the processing window 55 (to minimize data processing and data retention).

Maximize the look-ahead time 56.

Minimize the prediction period 57 in which a problem may occur with a certain probability.

As can be seen from FIG. 4, resolution means the time between consecutive sample points for a measurement or metric curve. Each measurement curve may have different resolution. The prediction period 57 is the period of time in which a problem is expected or predicted to occur with a certain probability. Prediction accuracy and look-ahead time are two conflicting requirements. Maximizing the look-ahead time without sacrificing the prediction accuracy is part of the selection criteria. Adding a cost factor to the false positives and negatives of each type of problem can assist in resolving the conflict between the look-ahead time and prediction accuracy.

To reduce the effect of transient problems (e.g., spikes in the measurement data), the problem duration 58 (i.e., the time when a problem starts a until the time the problem disappears without applying any action) in FIG. 4 and the problem frequency (i.e., the number of times a problem occurs within a certain time period) can be added to the effectiveness criteria. It should be noted that FIG. 4 only shows one example of defining the effectiveness criteria. In practice, the effectiveness criteria can be defined based on other factors and considerations.

The various components of the effectiveness criteria can be combined in several ways to compare the performance of candidate predictors. In one embodiment, effectiveness criteria are compared individually in some predefined order until one of the candidate predictors is determined to be better than another according to the current criterion. In another embodiment, one candidate predictor is determined to be better than another only if it is better according to all or some number of the effectiveness criteria. In a further embodiment, the performance along each of the effectiveness criteria is combined mathematically according to some predetermined formula to acquire an overall effectiveness value.

Referring back to FIG. 3, the genetic programming module 34 evolves the evolved predictor 35 using genetic programming techniques. Genetic programming is a type of evolutionary computing technology for generating computer programs. It is based on simulated evolution. Using this technology, generations of populations of computer programs are evolved based on fitness (or effectiveness) criteria that maximize the effectiveness (i.e., the fitness) of the programs in the new generation. This means that the genetic programming module 34 generates new generation of candidate predictors from the population pool of previous generations of programs To achieve this, the genetic programming module 34 needs to have a set of candidate predictors as seed original candidate predictors to start the population pool. These original candidate predictors can be randomly generated by the genetic programming module 34 or predefined. FIG. 3 does not show these original candidate predictors.

In one embodiment, the original candidate predictors are predefined programs. In another embodiment, the original candidate predictors are randomly generated programs. These candidate predictors are computer programs.

Figure 5:
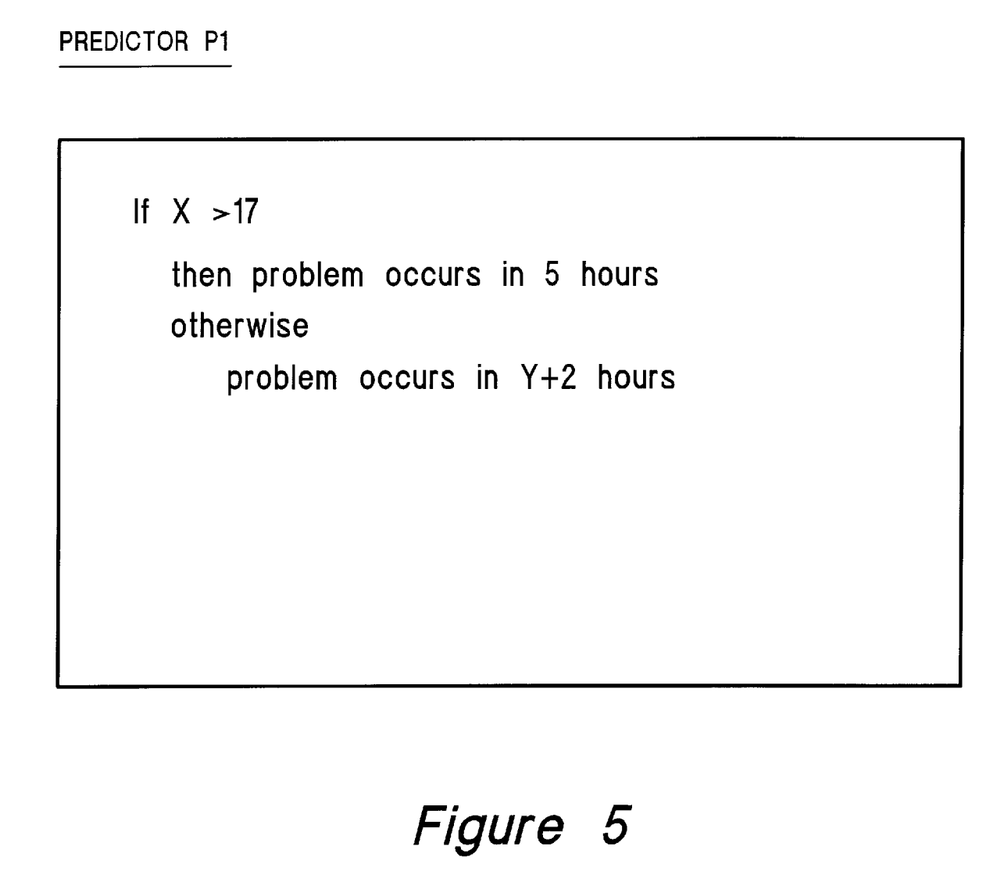
FIG. 5 shows one exemplary candidate predictor used by the genetic programming module of FIG. 3 either to evolve the evolved predictor or as the finally evolved predictor.

The candidate predictors are defined and implemented in terms of a set of primitive functions that are meaningful to the managed application 31. In one embodiment and when the managed application 31 is a distributed application, the functions are primitive mathematical functions (e.g., +, −, ×, ÷, etc.). The primitive functions may also include functions that describe or operate on data structures representing events, time, time intervals, and other attributes of the system being managed. The functions can also include conditionals, variables, constants, or other control operators. In this case, each of the candidate predictors can be a program or mathematical expression over the measurement data. FIG. 5 shows one example of one of the original candidate predictors. The example shown in FIG. 5 can also be one of the next generation candidate predictors evolved from the original candidate predictors.

Figure 6:
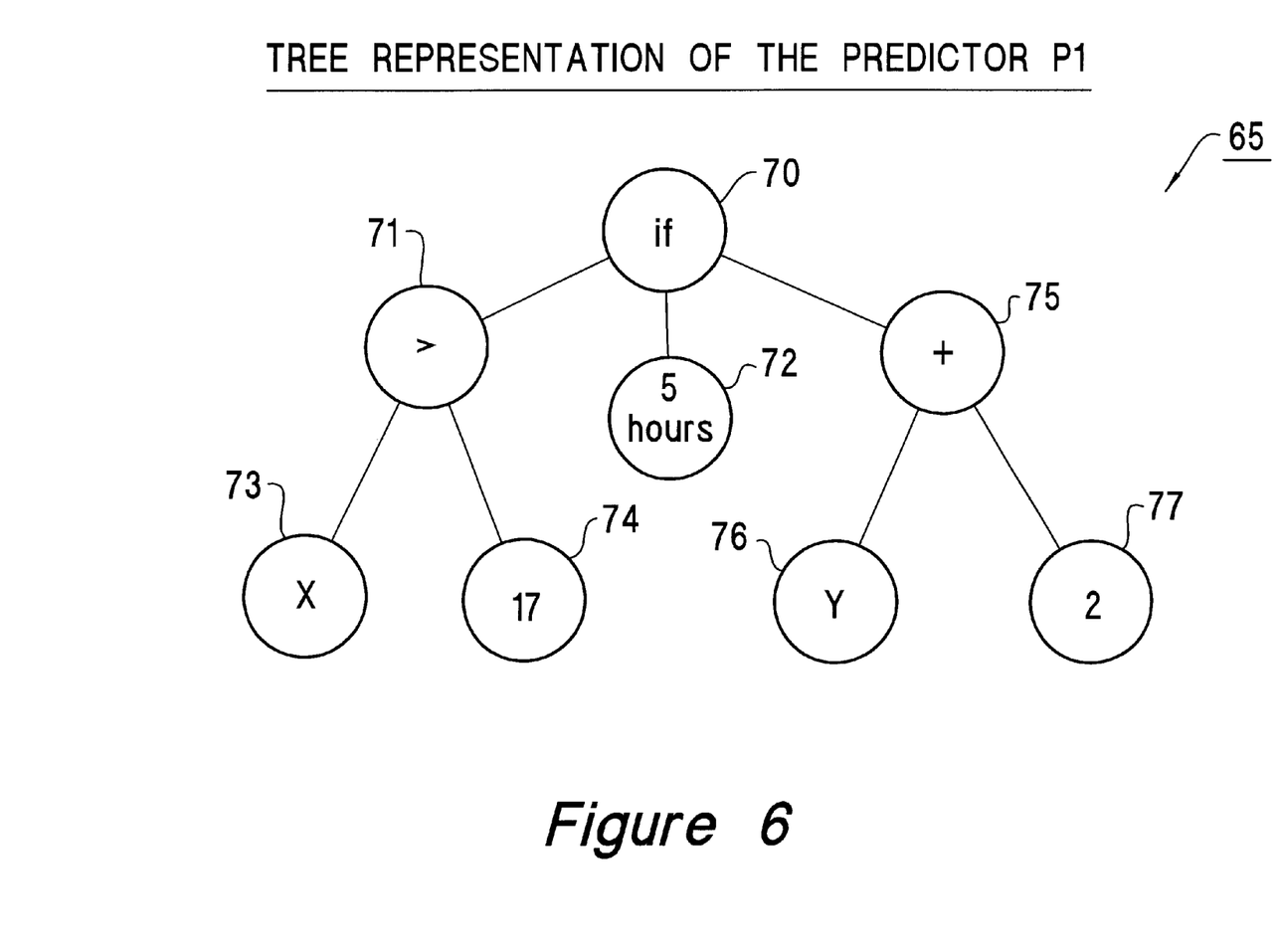
FIG. 6 shows a possible tree representation of the candidate predictor of FIG. 5.

The candidate predictors are canonically represented by trees that correspond to parse trees of the represented program or expression. Nodes in the trees represent the program functions, and arguments to these functions are supplied by descendant nodes. FIG. 6 shows such a tree representation for the candidate predictor P1. As can be seen from FIG. 6, the node 70 represents the program function of the candidate predictor P1. As described above, the program function can also be an algorithm taking the past measurement data as input. The program functions can also take primitive mathematical functions (e.g., +, −, ×, ÷, etc.) with conditionals, variables, constants, or other control operators. In addition, nodes 71 and 73–74 represent a sub-tree of the tree 65 and nodes 75–77 represent another sub-tree of the tree 65. Alternatively, the candidate predictors can be represented by sequences of machine instructions that represent programs. The programs represented may either compute the prediction or provide instruction to create a structure such as a neural network, belief network, finite automaton which embodies the predictor.

The genetic programming module 34 determines the effectiveness of the candidate predictors based on the predetermined effectiveness criteria. In this case, the effectiveness of a candidate program is determined by executing the candidate program on the past measurement data (or a subset of the past measurement data) and evaluating the outcome of the prediction produced by the candidate predictor based on the predetermined effectiveness criteria. Once the evaluation is done, that candidate program is assigned an effectiveness value based on the evaluation. The genetic programming module 34 then finds the best candidate program in the current population of candidate programs and determines if the best candidate program can qualify as the evolved predictor 35. If so, that candidate program is made to the evolved predictor 35. If not, the genetic programming module 34 needs to generate new candidate predictors that are more effective in predicting the system behavior based on the past data. In this case, the new candidate predictors are evolved from the previous candidate predictors selected due to their high effectiveness values. The reproduction process performed by the genetic programming module 34 is a random process. This means that the genetic programming module 34 replaces a randomly selected sub-tree of one parent candidate predictor by a randomly selected sub-tree of another parent candidate predictor. The evolving process generates new and next generation candidate predictors from the original candidate programs. These new programs are the next generation candidate programs that are then trained against the past measurement data and the effectiveness criteria to determine their effectiveness values. This process is repeated until the best candidate predictor qualified as the evolved predictor 35 is determined. The evolving process of the genetic programming module 34 is shown in FIG. 7, which will be described in more detail below.

Figure 7:
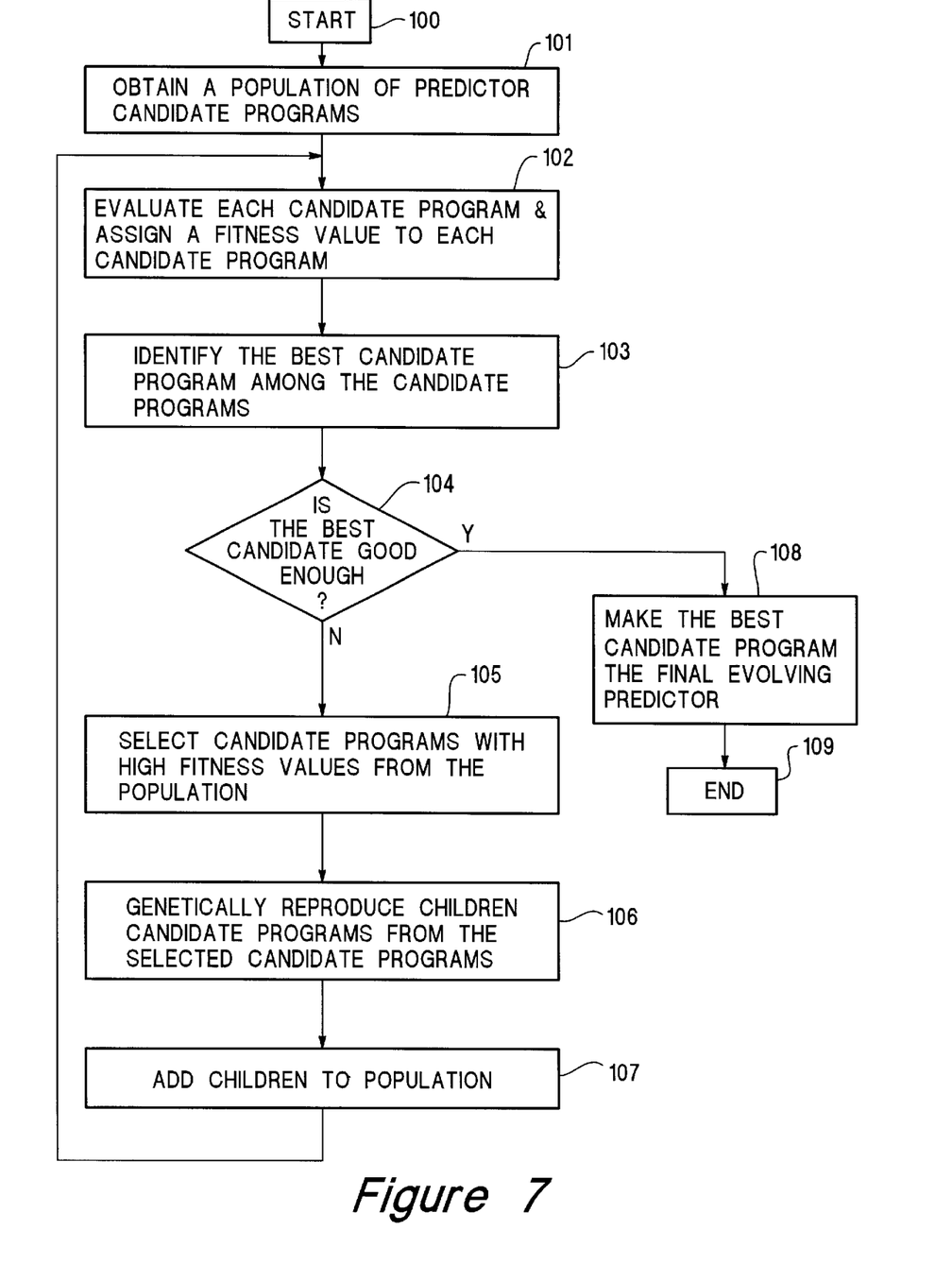
FIG. 7 shows in flow chart diagram form the process of the genetic programming module of FIG. 3 in evolving the evolved predictor of FIG. 3.

Referring to FIG. 7, the process of evolving the evolved predictor 35 (FIG. 3) by the genetic programming module 34 starts at the step 100. At the step 101, the genetic programming module 34 obtains a population of candidate predictors. Here, the candidate predictors are original or seed programs from which next generation or generations of candidate predictors are to be evolved.

At the step 102, each of the candidate predictors is applied with the past measurement data to evaluate the effectiveness of each candidate program. The effectiveness of each candidate program is evaluated using the predefined effectiveness criteria. The result is to assign a fitness or effectiveness value to each candidate program. The effectiveness/fitness value can be, for example, from one to ten or one to a hundred in value.

The genetic programming module 34 then identifies the best candidate program among all the candidate programs in the population at the step 103. This is performed based on the effectiveness/fitness value of the candidate program. The next step is a judgment step at which the genetic programming module 34 determines if the best candidate program is good enough as the evolved predictor 35. This can be determined by determining if the effectiveness value of the best candidate program exceeds a predetermined threshold value (e.g., 99% accurate rate).

If, at the step 104, it is determined that the best candidate program is not good enough, the process moves to the step 105, at which the candidate programs with high effectiveness/fitness values are selected from the population. Here, the high effectiveness values can be those values above a predetermined threshold.

At the step 106, the genetic programming module 34 then "genetically" reproduces children (or next generation) candidate predictors from the selected candidate programs. As described above, this process involves selecting a candidate program from the selected candidate programs. Then a sub-tree of that program is randomly selected to be replaced by another randomly selected sub-tree of another selected candidate program of the selected candidate programs. This generates a new and next generation candidate predictor. This is referred to as crossover. If the programs are represented as sequences instead of trees, crossover canonically involves creating an offspring which contains sub-sequences extracted from each of its parents. However, other means of creating children or next generation candidate predictors can be used. For example, mutation, functional abstraction, and oversampling may be used.

The genetic programming module 34 repeats this process until next generation candidate programs have been evolved from all of the selected candidate programs. Then the process moves to the step 107, at which point all the next generation candidate programs are added to the population of candidate predictors, typically replacing the old generation. The process then returns to the step 102.

If, at the step 104, it is determined that the best candidate program is good enough, the process moves to the step 108. At the step 108, the best candidate program is made to be the evolved predictor 35 and the process ends at the step 109.

In an alternative embodiment, the best candidate predictor program identified in the step 103 is used as the evolved predictor 35 while the genetic programming module 34 continues to search for a better predictor. In this embodiment, the store 33 may be augmented by more recently collected measurement data.

Referring back to FIG. 3, when applied with current measurement data from the measurement module 32, the evolved predictor 35 accurately predicts the system behavior (e.g., performance violations) of the managed application 31. This means that the evolved predictor 35 predicts performance violations of the managed application 31 ahead of time. The predictions from the evolved predictor 35 are then fed to the display 36 for display. This allows the system administrator of the managed application 31 to view the predictions and to take appropriate actions accordingly.

In addition, the predictions from the evolved predictor 35 can also be fed to the control system 37. This means that the predictions generated by the evolved predictor 35 can also be used to control or adjust the managed application 31 in such a way that the predicted performance violation or problem is avoided. The control system 37 is used to control the managed application 31. The control system 37 can also configure (either dynamically or statically) the managed application 31. For example, when the evolved predictor 35 generates a performance violation prediction that will occur within a predicted time period, the control system 37 can adjust the managed application 31 (e.g., decrease the load, increase resource availability) so as to correct the situation before the performance violation actually happens. The control system 37 can be implemented using any known means and is dependent upon the structure of the managed application 31.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for monitoring and managing system behavior of a distributed application system, comprising:
   a measurement module coupled to the distributed application system to generate measurement data of the distributed application system, wherein the measurement data include past measurement data and current measurement data, wherein the past measurement data include an identified event of interest;
   a store that stores the past measurement data of the distributed application system generated by a monitoring module;
   a genetic programming module coupled to the store to evolve an evolved predictor based on the past measurement data of the distributed application system and predetermined effectiveness criteria such that the evolved predictor predicts system behavior of the distributed application system when supplied with the current measurement data, wherein the genetic programming module genetically manipulates a set of candidate predictors to produce the evolved predictor;
   a control module coupled to receive predictions produced from the evolved predictor when supplied with the current measurement data to control managed distributed application system to adjust itself in accordance with the predictions.

2. The system of claim 1, further comprising a display coupled to the evolving predictor to display predictions produced by the evolving predictor.

3. The system of claim 1, wherein the past and current measurement data include plurality sets of measurement metrics, wherein the evolved predictor is a genetically generated program that can process the current measurement data to predict the behavior of the distributed application system ahead of time.

4. The system of claim 1, wherein each of the set of candidate predictors is described by a plurality of mathematical functions, conditions, constants, and other control operators such that each program represents an algorithm with the measured metrics as input.

5. The system of claim 1, wherein the effectiveness criteria are selected from a group which includes maximizing prediction accuracy, minimizing processing window size, maximizing look-ahead time, and minimizing prediction period in which a problem may occur with certain probability.

6. The system of claim 1, wherein the genetic programming module evolves the evolved predictor by
   (I) evaluating each of the candidate predictors in accordance with the effectiveness criteria in order to assign an effectiveness value to each of the candidate predictors;
   (II) determining which one of the candidate predictors has the best effectiveness value and if that candidate predictor is good enough to serve as the evolved predictor;
   (III) if none of the candidate predictors has the best effectiveness value or if the best effectiveness value is not good enough to serve as the evolved predictor, generating next generation candidate predictors by replacing a randomly selected sub-program of one of the candidate predictors with a sub-program of another program and repeating the steps (I)–(II), wherein the candidate predictors are selected based on their effectiveness values.

7. The system of claim 1, wherein each of the set of candidate predictors is described by a plurality of mathematical functions such that each program represents a mathematical expression over the measured metrics.

8. A system for defining or generating an evolved predictor for predicting system behavior of a distributed application system, comprising:
   a measurement module coupled to the distributed application system to generate measurement data of the distributed application system, wherein the measurement data include past measurement data and current measurement data, wherein the past measurement data include an identified event of interest;
   a store that stores the past measurement data of the distributed application system;
   a genetic programming module coupled to the store to evolve the evolved predictor based on the past measurement data and predetermined effectiveness criteria, wherein the genetic programming module genetically manipulates a set of candidate predictors to produce the evolved predictor that predicts the behavior or future events of the distributed application system when supplied with current measurement data, wherein the evolved predictor does not detect any defect within the distributed application system.

9. The system of claim 8, wherein the past and current measurement data include a plurality sets of measurement metrics, wherein the evolved predictor is a genetically generated program that can process the current measurement data to predict the behavior of the system ahead of time.

10. The system of claim 8, wherein each of the set of candidate predictors is described by a plurality of mathematical functions such that each candidate predictor represents a mathematical expression over the measured metrics.

11. The system of claim 8, wherein each of the set of candidate predictors is described by a plurality of mathematical functions, conditions, constants, and other control operators such that each candidate predictor represents an algorithm with the measured metrics as input.

12. The system of claim 8, wherein the effectiveness criteria are selected from a group which include maximizing prediction accuracy, minimizing processing window size, maximizing the look-ahead time, minimizing the prediction period in which a problem may occur with certain probability.

13. The system of claim 8, wherein the genetic programming module evolves the evolved predictor by (I) evaluating each of the candidate predictors in accordance with the effectiveness criteria in order to assign an effectiveness value to each of the candidate predictors;

(II) determining which one of the candidate predictors has the best effectiveness value and if that candidate predictor is good enough to serve as the evolved predictor;

(III) if not, generating next generation candidate predictors by replacing a randomly selected sub-program of one of the candidate predictors with a sub-program of another program and repeating the steps (I)–(II), wherein the candidate predictors are selected based on their effectiveness values.

* * * * *